(No Model.)
J. T. WILSON.
ELECTRIC MOTOR.
No. 468,716.  Patented Feb. 9, 1892.
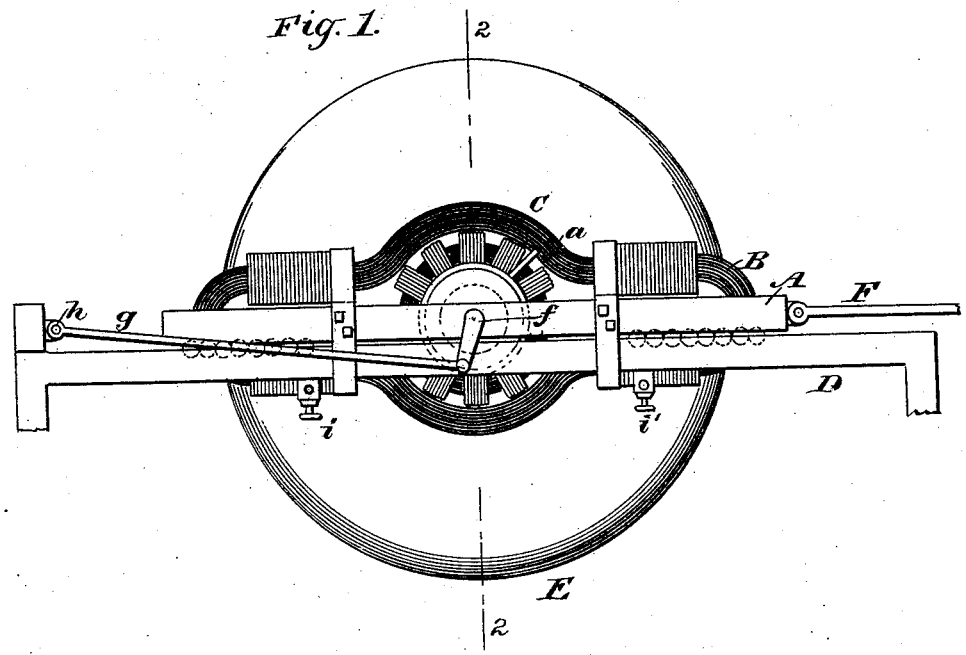
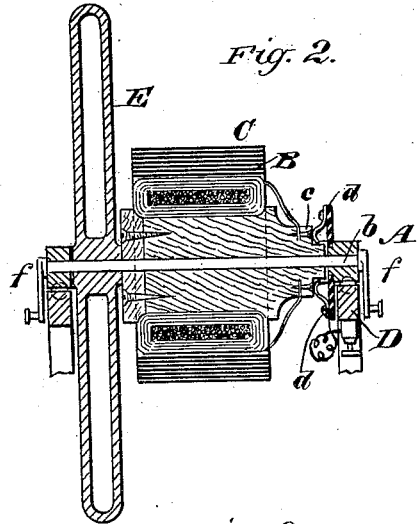
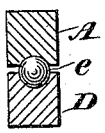
WITNESSES:
J. A. E. Cruswell
C. Sedgwick
INVENTOR
J. T. Wilson
BY Munn & Co.
ATTORNEYS.

UNITED STATES PATENT OFFICE.

JAMES T. WILSON, OF TYRONE, PENNSYLVANIA.

ELECTRIC MOTOR.

SPECIFICATION forming part of Letters Patent No. 468,716, dated February 9, 1892.

Application filed August 6, 1891. Serial No. 401,814. (No model.)

*To all whom it may concern:*

Be it known that I, JAMES T. WILSON, of Tyrone, in the county of Blair and State of Pennsylvania, have invented a new and Improved Electric Motor, of which the following is a specification, reference being had to the annexed drawings, forming a part thereof, in which—

Figure 1 is a side elevation of my improved electric motor. Fig. 2 is a vertical transverse section of the same, taken on the line 2 2 in Fig. 1; and Fig. 3 is a transverse section of the slide, showing the ball-bearings.

Similar letters of reference indicate corresponding parts in all the views.

The object of my invention is to construct an electric motor in which continuous rotary motion will be converted into effective reciprocating motion.

My invention consists in the construction and combination of parts hereinafter described and claimed.

Upon the frame A is mounted the field-magnet B of the electric motor C. The said electric motor is of well-known construction, having the ring-armature $a$, the armature-shaft $b$, journaled in the frame A, the commutator $c$, placed on the armature-shaft, and the brushes $d$ for conveying the current to the armature. The frame A is supported by a frame D, and the sides of the said frames A D are provided with grooves in their adjacent surfaces adapted to receive the balls $e$, which, in connection with the grooved surfaces of the frames, form ball-bearings upon which the motor may reciprocate freely in a longitudinal direction. Upon opposite ends of the armature-shaft $b$ are secured cranks $f$, connected by connecting-rods $g$ with fixed pivots $h$.

The electric motor C is provided with binding-posts $i$ $i'$ for receiving the wires by which it receives its current. Upon the armature-shaft $b$ is secured a fly-wheel E for storing the power of the motor and equalizing its motion. I do not, however, limit myself to the use of a single fly-wheel, as I may in practice place a fly-wheel upon the armature-shaft at the opposite side of the armature.

To the end of the frame A is jointed a rod F, which is connected with the mechanism to be operated by the reciprocating movement of the motor and frame.

My improved motor may be applied to bicycles, cars, tricycles, drilling-machines, the driving of saws, and other uses requiring a reciprocating motion.

When the machine is used at an angle, or in larger machines, a gliding guide would be required under the supports attached to the iron bands that hold the motor to the supports or frame to keep the machine on its bearings.

Having thus described my invention, I claim as new and desire to secure by Letters Patent—

1. The combination, with the fixed frame and the reciprocating frame mounted thereon, of an electric motor having its armature-shaft journaled transversely in bearings on the said reciprocating frame, and a crank and pitman connection between the armature-shaft and the fixed frame, substantially as set forth.

2. The combination, with the fixed frame and the reciprocating frame thereon, of an electric motor mounted on the latter frame and having its armature-shaft journaled in bearings in the sides thereof, cranks on the ends of the armature-shaft, pitmen connecting both cranks with the fixed frame, and a transmitting-rod connecting with the reciprocating frame, substantially as set forth.

JAMES T. WILSON.

Witnesses:
G. H. SCOTT,
HARRY STONEBRAKER.